United States Patent
Horneman et al.

(10) Patent No.: US 7,535,885 B2
(45) Date of Patent: May 19, 2009

(54) METHOD OF SELECTING TRANSPORT CHANNEL PARAMETERS, RADIO SYSTEM, CONTROLLER, USER EQUIPMENT AND BASE STATION

(76) Inventors: Kari Horneman, Kuijantie 36, FI-90800 Oulu (FI); Kari Pajukoski, Purantie 3, FI-90240 Oulu (FI); Esa Tiirola, Rensselikuja 5, N 19, FI-90630 Oulu (FI)

( * ) Notice: Subject to any disclaimer, the term of this patent is extended or adjusted under 35 U.S.C. 154(b) by 1077 days.

(21) Appl. No.: 10/836,620

(22) Filed: May 3, 2004

(65) Prior Publication Data

US 2005/0185594 A1 Aug. 25, 2005

(30) Foreign Application Priority Data

Feb. 25, 2004 (FI) .................................. 20040294

(51) Int. Cl.
*H04J 13/00* (2006.01)
(52) U.S. Cl. ........................ 370/342; 370/335; 370/441; 370/252; 370/278; 370/329; 455/403; 455/450; 455/509
(58) Field of Classification Search ................. 370/333, 370/342, 329; 455/522
See application file for complete search history.

(56) References Cited

U.S. PATENT DOCUMENTS

| | | | |
|---|---|---|---|
| 6,646,995 | B1 | 11/2003 | Le Strat et al. |
| 2003/0174686 | A1* | 9/2003 | Willenegger et al. ........ 370/342 |

FOREIGN PATENT DOCUMENTS

| | | |
|---|---|---|
| EP | 1 213 868 A1 | 6/2002 |
| WO | WO 03/019805 A1 | 3/2003 |

* cited by examiner

*Primary Examiner*—Fan Tsang
*Assistant Examiner*—Simon King (57) ABSTRACT

There is provided a method of selecting transport channel parameters and a radio system comprising user equipment communicating with at least one base station and a controller for controlling the communication between the user equipment and the base station. The base station comprises means for providing information on the type of reception used in the base station, the controller comprises means for generating more than one transport format combination set, TFCS, the TFCSs having different effective coding rates, ECR, for different data rates used in the radio system, and means for selecting a specific TFCS to be used by the user equipment on the basis of the type of reception used in the base station and the effective coding rates of the more than one TFCS, and the user equipment comprises means for using the specific TFCS based on the selection of the controller.

30 Claims, 3 Drawing Sheets

METHOD OF SELECTING TRANSPORT CHANNEL PARAMETERS, RADIO SYSTEM, CONTROLLER, USER EQUIPMENT AND BASE STATION

BACKGROUND OF THE INVENTION

1. Field of the Invention

The invention relates to a method of selecting transport channel parameters, to a radio system, a controller, user equipment and a base station in a radio system.

2. Description of the Related Art

Transport channels are used to carry data in data link layers or in radio systems. On the transport channels, different transport formats are used to manage multiplexing. Transport format sets, TFS, can be built based on the transport formats. There is a list of transport formats applicable for each transport channel. A subset of all feasible transport formats is called a transport format combination, TFC, and it contains one transport format for each transport channel. A transport format combination set, TFCS, defines a set of transport format combinations.

The transport format defines the error protection scheme used in the transmission. The error protection scheme includes a coding rate and rate matching definitions. The combination of these attributes defines an effective coding rate. In Node B reception of 3G systems, a Rake receiver is normally used. It is possible to use advanced receivers, like parallel interference cancellers, PIC, in reception as well. Advanced receivers utilize despread bits to improve the performance of the reception. However, the performance of advanced receivers is optimal with an effective coding rate, ECR, which is different from the one required by the Rake receiver with the same user data rate. If a user terminal selects the used transport format combination without knowledge of the type of the receiver used in the Node B reception, non-optimal performance of data transfer may occur.

SUMMARY OF THE INVENTION

According to an aspect of the invention, there is provided a method of selecting transport channel parameters in a radio system. The method comprises providing information on the type of reception used in a base station of the radio system, generating more than one transport format combination set, TFCS, comprising transport channel parameters, the TFCSs having different effective coding rates, ECR, for different data rates used in the radio system, and selecting a specific TFCS to be used by user equipment of the radio system when communicating with the base station on the basis of the type of reception used in the base station and the effective coding rates of the more than one TFCS.

According to an embodiment of the invention, there is provided a radio system comprising one or more user equipment communicating with at least one base station and a controller for controlling the communication between the user equipment and the base station. The base station comprises means for providing information on the type of reception used in the base station, the controller comprises means for generating more than one transport format combination set, TFCS, comprising transport channel parameters, the TFCSs having different effective coding rates, ECR, for different data rates used in the radio system, and means for selecting a specific TFCS to be used by the user equipment on the basis of the type of reception used in the base station and the effective coding rates of the more than one TFCS, and the user equipment comprises means for using the specific TFCS when communicating with the base station on the basis of the selection of the controller.

According to another aspect of the invention, there is provided a controller in a radio system, the controller controlling communication between user equipment and one or more base stations. The controller comprises means for receiving information on the type of reception used in the base station, means for generating more than one transport format combination set, TFCS, comprising transport channel parameters, the TFCSs having different effective coding rates, ECR, for different data rates used in the radio system, and means for selecting a specific TFCS to be used by the user equipment on the basis of the type of reception used in the base station and the effective coding rates of the more than one TFCS.

According to another aspect of the invention, there is provided user equipment for a radio system. The user equipment comprises means for receiving information on the type of reception used in a base station of the radio system, means for receiving one or more transport format combination sets, TFCSs, comprising transport channel parameters received from a controller of the radio system, the TFCSs having different effective coding rates, ECR, for different data rates used in the radio system and means for selecting which specific TFCSs to use when communicating with the base station on the basis of the type of reception used in the base station, the effective coding rates of the one or more TFCSs and information received from the base station.

According yet another aspect of the invention, there is provided a base station for a radio system. The base station comprises means for providing information on the type of reception used in the base station for a controller of the radio system in order to enable the controller to select a specific transport format combination set, TFCS, comprising transport channel parameters from a set of more than one TFCS generated by the controller, the TFCSs having different effective coding rates, ECR, for different data rates used in the radio system.

The embodiments of the invention provide several advantages. Optimal data transfer performance is achieved even when different types of receivers are used in the base station. The optimum selection of a transport format also offers better quality of service for the end users of user equipment. There are coverage and capacity improvements for the network. Further, multi-access interference is decreased due to lower transmit powers of active user equipment.

BRIEF DESCRIPTION OF THE DRAWINGS

In the following, the invention will be described in greater detail with reference to the preferred embodiments and the accompanying drawings, in which.

DETAILED DESCRIPTION OF THE PREFERRED EMBODIMENTS

Figure 1:
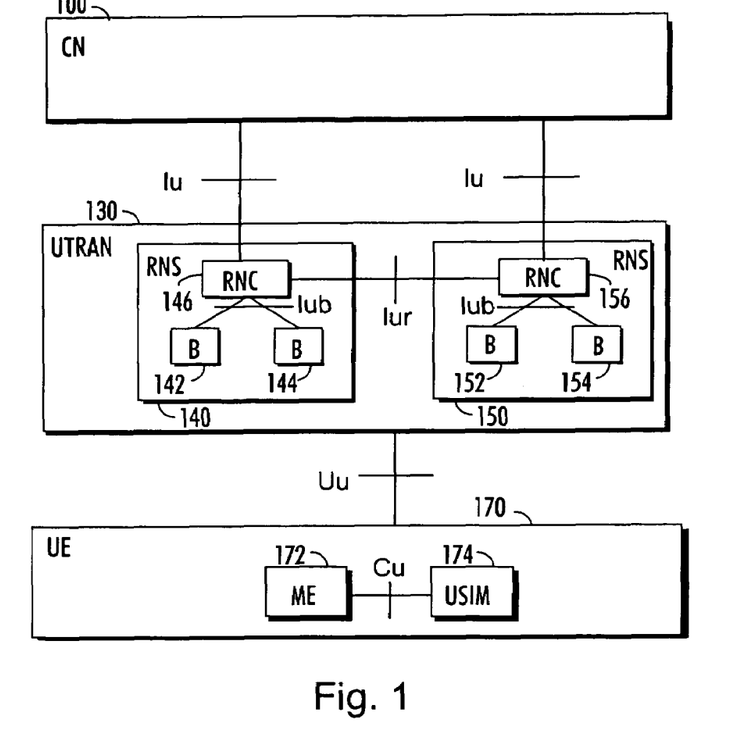
FIG. 1 shows a simplified block diagram illustrating the structure of a radio system.

With reference to FIG. 1, let us examine an example of a radio system in which the preferred embodiments of the invention can be applied. A radio system in FIG. 1, known at least as UMTS (Universal Mobile Telecommunications System) and IMT-2000 (International Mobile Telecommunications 2000), represents a third-generation radio system. The embodiments are, however, not restricted to these systems described by way of example, but a person skilled in the art can also apply the instructions to other radio systems containing corresponding characteristics.

FIG. 1 is a simplified block diagram, which shows the most important parts of a radio system and the interfaces between them at a network-element level. The structure and functions of the network elements are not de-scribed in detail, because they are generally known.

The main parts of a radio system are a core network (CN) 100, a radio access network 130 and user equipment (UE) 170. The term UTRAN is short for UMTS Terrestrial Radio Access Network, i.e. the radio access network 130 belongs to the third generation and is implemented by wideband code division multiple access (WCDMA) technology. The main elements of the UTRAN are a radio network controller (RNC) 146, 156, Node-Bs 142, 144, 152, 154 and user equipment 170. The UTRAN is attached to the existing GSM core network 100 via an interface called Iu. This interface is supported by the RNC 146, 156, which manages a set of base stations called Node-Bs 142, 144, 152, 154 through interfaces called Iub. The UTRAN is largely autonomous from the core network 100 since the RNCs 146, 156 are interconnected by the Iur interface.

On a general level, the radio system can also be defined to com-prise user equipment, which is also known as a subscriber terminal and mobile phone, for instance, and a network part, which comprises the fixed infrastructure of the radio system, i.e. the core network, radio access network and base station system.

From the point of view of Node-B 142, 144, 152, 154, i.e. base station, there is one controlling RNC 146, 156, where its Iub interface terminates. The controlling RNC 146, 156 also takes care of admission control for new mobiles or services attempting to use the Node-B 142, 144, 152, 154. The controlling RNC 146, 156 and its Node-Bs 142, 144, 152, 154 form an RNS (Radio Network Subsystem) 140, 150.

The user equipment 170 may comprise mobile equipment (ME) 172 and a UMTS subscriber identity module (USIM) 174. The USIM 174 contains information related to the user and information related to information security in particular, for instance, an encryption algorithm.

In UMTS networks, the user equipment 170 can be simultaneously connected to a plurality of Node-Bs in occurrence of soft handover.

From the point of view of the user equipment 170, there is a serving RNC 146, 156 that terminates the mobiles link layer communications. From the CN 100 point of view, the serving RNC 146, 156 terminates the Iu for this user equipment 170. The serving RNC 146, 156 also takes care of admission control for new mobiles or services attempting to use the CN 100 over its Iu inter-face.

In UMTS, the most important interfaces between network elements are the Iu interface between the CU 100 and the radio access network 130, which is divided into the interface IuCS on the circuit-switched side and the interface IuPS on the packet-switched side, and the Uu interface between the radio access network and the user equipment.

Figure 2:
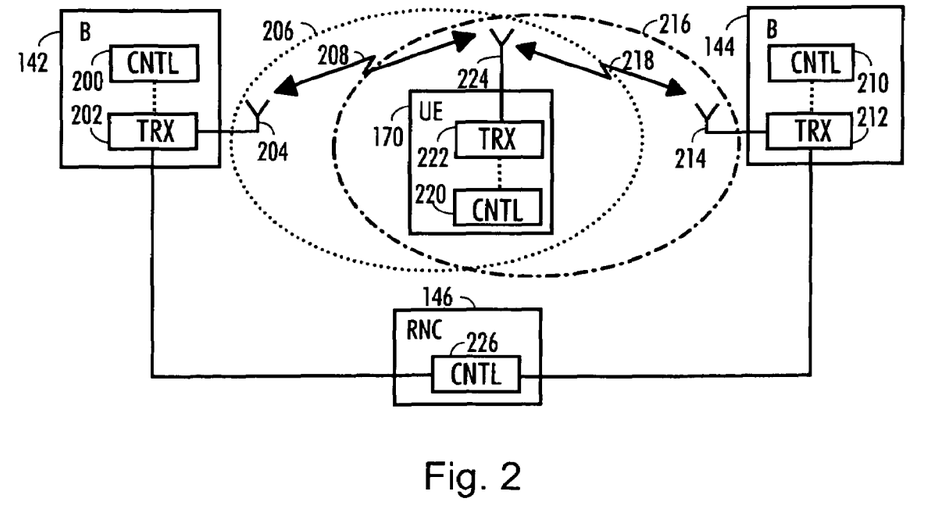
FIG. 2 shows another example of a data transmission system.

In the following, a cellular WCDMA radio telecommunications system will be described by means of FIG. 2. FIG. 2 shows a part of a simplified radio system that comprises user equipment 170, two base stations 142, 144 and a controller 146. The first base station 142 comprises a transceiver 202, an antenna 204 and a control block 200. Likewise, the second base station 144 comprises a transceiver 212, an antenna 214 and a control block 210. The controller 146 also comprises a control block 226. The user terminal 170 also comprises a normal transceiver 222 and an antenna for establishing a radio connection and a control block 220. The transceivers 202, 212, 222 use CDMA technology (Code Division Multiple Access). In the CDMA technology, i.e. in code division multiple access, radio resources are allocated to each user by means of user-specific codes. The technique is generally known, for which reason it will not be described in greater detail here. The antennas 204, 214, 224 can be implemented by common prior-art solutions, e.g. as omnidirectional antennas or as antennas employing a directed antenna beam. In the radio telecommunications system, the radio cells created by base stations usually overlap to some extent to provide extensive coverage. This is illustrated in FIG. 2 by a radio cell 206 created by the base station 142 and a radio cell 216 created by the base station 144. In the existing radio telecommunications systems, wireless telecommunications connections are established by user equipment and base stations which communicate with one another on a radio connection, i.e. calls or data transmission connections between different user equipment are established via base stations. This is illustrated in FIG. 2 by radio connections 208, 218. In particular, FIG. 2 shows a situation where user equipment 170, which may be mobile, communicates over a radio connection with the first base station 142, simultaneously measuring common pilots of this base station 142 and the second base station 144 for a possible handover. In CDMA, for example, radio transmissions using the same frequency band are coded in a way that signals of a certain transmitter can be received only by certain receivers. Channel and cell handovers enable continuity of the radio connection when the user terminal moves or the physical radio channel changes as a function of time.

The control blocks 200, 210, 220, 226 refer to blocks controlling the functions of the device and are nowadays usually implemented as a processor and its software, but various hardware solutions are also feasible, e.g. a circuit built from logic components or one or more application-specific integrated circuits, ASIC. A hybrid of these different implementations is also feasible.

Transport channels are used to carry data in data link layers or in radio systems. The transport channels that are used to carry data in the radio system are mapped to physical channels by a physical layer (layer 1) protocol in an interface between data link and physical layer. The physical layer provides bandwidth-on-demand services in 3GPP ($3^{rd}$ Generation Partnership Project) systems. Thus, the transport channels support variable bit rates. The physical layer is responsible for multiplexing transport blocks into transport channels at the frame level. On the transport channels, different transport formats are used to manage multiplexing. The transport format contains several attributes, which are divided to dynamic attributes and semi-static attributes. The dynamic attributes define a transport block size and a transport block set size. The semi-static attributes define a transmission time interval, error protection scheme (type, coding rate, rate matching) and size of cyclic redundancy check, CRC. Transport format sets, TFS, can be built based on the transport formats. Within one transport format set, TFS, only the dynamic attributes change and the semi-static attributes are the same. There is a list of transport formats applicable for each transport channel. A subset of all possible transport formats is called a transport format combination, TFC, and it contains one transport format for each transport channel.

A transport format combination set, TFCS, defines a set of transport format combinations. In a TFCS there is a dynamic part and a semi-static part as described in conjunction with the transport format. In the dynamic part, there are combinations from 1 to n, each of which defines the dynamic part for each transport channel. In the semi-static part, there are semi-static attributes for each transport channel. The transport format combination is controlled by medium access control, MAC. However, MAC controls only the dynamic part of the transport format combination. As the dynamic attributes define the transport block size and the transport block set size, that is, the number of bits in the transport block and the number of bits in the transport block set, respectively, MAC controls eventually the bit rate.

As mentioned previously, the transport format combination sets containing several transport formats are formed to enable the best possible combination for transferring a certain amount of data within a certain time period through a physical link. The MAC protocol selects the transport format combination set on the basis of the data amount and the maximum allowable transmit power. The major factor in the selection is the data rate. It is well known that a certain data rate can be established by several effective coding rates, ECR. The effective coding rate is a combination of original coding rate (e.g. Turbo encoding 1/3), rate matching and spreading factor used in a radio system. The rate matching can be carried out either by puncturing or repetition.

In an embodiment of the invention, the base station 142 is configured to provide information on the type of reception used in the base station 142. The controller 146 is configured to generate more than one transport format combination set, TFCS, comprising transport channel parameters, the TFCSs having different effective coding rates, ECR, for different data rates used in the radio system, and also to select a specific TFCS to be used by the user equipment 170 on the basis of the type of reception used in the base station 142 and the effective coding rates of the more than one TFCS. The user equipment 170 is configured to use the specific TFCS on the basis of the selection of the controller 146. In an embodiment, it is also possible that the TFCSs have different effective coding rates, ECR, for different transmit powers used in the radio system as well.

The controller 146 is further configured to send the generated one or more TFCSs to the user equipment 170. In an embodiment, the controller 146 is configured to send only the selected specific TFCS to the user equipment 170. It is also possible that more than one TFCS is sent to the user equipment 170, and the controller 146 is configured to signal the user equipment 170 which one of the more than one TFCS is the specific TFCS to be used by the user equipment 170. It is possible that the controller 146 or at least part of the controller 146 is located in the base station 142.

In an embodiment, the transport format combination set may be formed so that there will be two possible semi-static attribute variants for each transport channel, that is, for each data service rate there may be two possible semi-static attribute variants. The differentiating factor between these variants is the effective coding rate. Further, the transport format set may be modified so that there will be two possible semi-static attribute variants in the semi-static part. The user terminal 170 may be informed of which one of the two transport formats should be used. Further, the controller 146 is informed of which type of receiver is used in the reception of the base station 142. Thus, the controller 146 may send the information on which one of the two transport format variants should be used to the user equipment 170 at the same time as the information on the usable transport format combination set is sent to the user equipment 170. Only one bit is needed to send the information on which transport format variants to use to the user equipment 170. The different transport format variants may be included in the same transport format set so that there is a common dynamic part, an even attribute variant in the semi-static part to be used with a Rake reception and an odd attribute variant to be used with advanced receiver reception. A Rake receiver is capable of receiving and combining multipath signals by locking onto one or several strongest received multipath signals and combining them. The Rake receiver consists of receiver units, which are called fingers, and of a combiner. The advanced receiver is, for example, a parallel interference canceller, PIC, type receiver. The advanced receivers make data decisions based on the whole received data block and utilize despread bits to improve the performance of the reception. Further, the MAC protocol may check which one of the two transport format variants (even or odd) should be used when selecting the transport format combination set.

The transport format combination sets, TFCSs, are defined as part of configuration messages sent from the controller 146 to the user equipment 170, for example. The controller 146 may also reconfigurate the transport format configuration sets or restrict the use of some transport format configuration sets by restriction messages. In an embodiment, the transport format combination set may be of the type described in the following table 1:

TABLE 1

| TFCS0 | even |
| TFCS0 | odd |
| TFCS1 | even |
| TFCS1 | odd |
| . | . |
| . | . |
| . | . |
| TFCSn | even |
| TFCSn | odd |

The MAC protocol may select from the above type of table either the even part or the odd part for further processing based on the information delivered by the controller 146. For example, the semi-static attribute variant option may select bit=0 for Rake reception and bit=1 for advanced receiver reception. The pre-selection may be an additional feature to a transport format combination selection, for example.

As the controller 146 is responsible for the configuration of the user equipment 170, the base station 142 should send the information on the type of reception in use in the base station 142. The information may be added to a suitable message sent from the base station 142 to the controller 146. In practice, the messaging and protocols in the controller 146 may be implemented by software.

Next, some performance differences between different transport formats of Rake and PIC receivers using different effective coding rates are shown. The effective coding rate, ECR, is defined by equation 1:

$$ECR = \frac{R_c}{R_i} \qquad \text{Equation 1}$$

where:

$R_c$ is a physical channel bit rate, and $R_i$ is an information bit rate.

Alternative transport formats for an information bit rate 64 kbits/s with two effective coding rates, namely 4/15 and 8/15, are presented in the following table 2:

TABLE 2

Alternative transport formats for bit rate 64 kbit/s

| ECR | 8/15 | 4/15 |
|---|---|---|
| Spreading factor | 32 | 16 |
| Symbol rate [ksbs/s] | 120 | 240 |
| Effective Coding Rate | 0.53 | 0.27 |
| Repetition [%] | −39 | 21 |

From the point of view of coverage the Rake receiver operates 0.6 to 1.0 dB better with the effective coding rate 4/15 than with the effective coding rate 8/15. The reason for this is that the effective coding rate 8/15 requires 39% puncturing and this will degrade the performance of 1/3 Turbo coding. In case of a PIC receiver, the number of users determines which effective coding rates (8/15 or 4/15) makes the performance better. In a fully loaded case, for example with 45 users, the coverage of the effective coding rate 8/15 is about 1.0 dB better than that of the effective coding rate 4/15.

Further, with the PIC receiver the effective coding rate 8/15 provides about 25% more capacity than the effective coding rate 4/15. On the other hand, with the Rake receiver the effective coding rate 4/15 provides about 25% more capacity than the effective coding rate 8/15.

The better operation of a PIC receiver with a higher ECR is due to the higher efficiency of the PIC receiver. A symbol error rate is lower with a higher ECR with the PIC receiver. The symbol error rates required to achieve a BLER (Block Error Rate) of 10% is 8% with ECR of 8/15 and 18% with ECR of 4/15 respectively. The efficiency of a PIC receiver, $\beta$, can be defined by reducing a quotient of the number of users of the Rake receiver, $K_{RAKE}$, and the number of users of the PIC receiver, $K_{PIC}$, from the number of one by equation 2:

$$\beta = 1 - \frac{K_{RAKE}}{K_{PIC}} \quad \text{Equation 2}$$

The estimated efficiency of the PIC receiver is about 0.5 with ECR of 8/15 and about 0.3 with ECR of 4/15.

Figure 3:
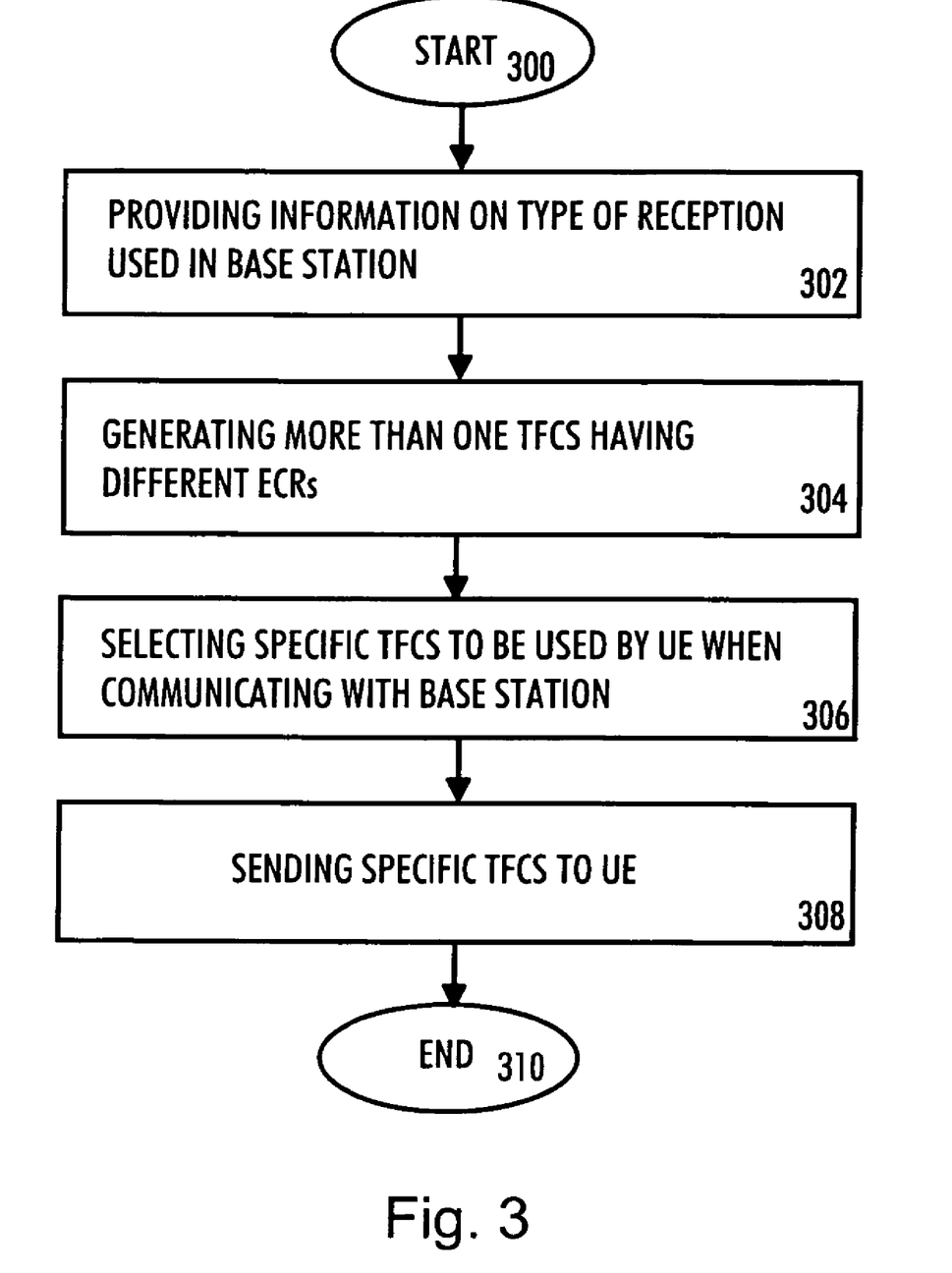
FIGS. 3 and 4 illustrate examples of a method of selecting transport format combination sets in a radio system.

Referring to FIG. 3, an embodiment of the method of selecting a transport format combination set will now be explained. The method starts in 300. In 302, information on the type of reception used in a base station of a radio system is provided. The base station sends the information to the controller, for example. In 304, more than one transport format combination set, TFCS, are generated in the controller, the TFCSs having different effective coding rates, ECR, for different data rates and transmit powers used in the radio system. In an embodiment, a separate TFCS for a Rake and an advanced receiver reception is generated, for example. In 306, a specific TFCS to be used by user equipment of the radio system when communicating with the base station on the basis of the type of reception used in the base station and the effective coding rates of the more than one generated TFCSs is selected in the controller. In 308, the controller sends only the selected specific TFCS to the user equipment. The embodiment of the method ends in 310.

Figure 4:
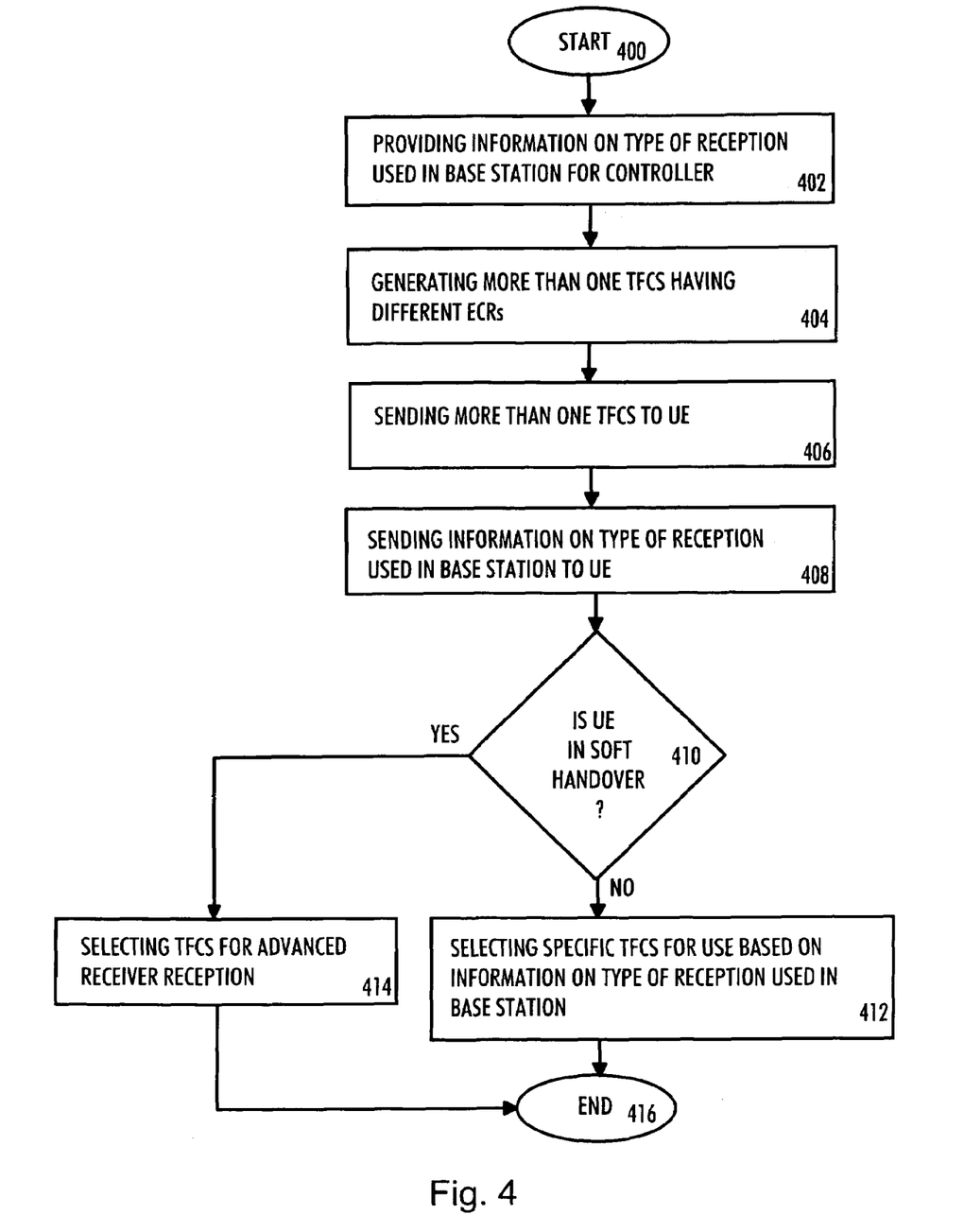

Referring to FIG. 4, another embodiment of the method of selecting a transport format combination set will now be explained. The method starts in 400. In 402, information on the type of reception used in a base station of a radio system is provided for a controller. In 404, more than one transport format combination set, TFCS, are generated in the controller, the TFCSs having different effective coding rates, ECR, for different data rates and transmit powers used in the radio system. In 406, more than one TFCS is sent to the user equipment from the controller. In 408, the information on the type of reception used in a base station is sent to the user equipment from the controller. It is possible that this information is sent at the same time the controller sends the TFCSs to the user equipment. If, in 410, the user equipment is in soft handover, then 414 is entered where the user equipment selects a TFCS for advanced receiver reception. Otherwise, 412 is entered where the TFCS is selected based on the information on the type of reception used in the base station. Depending on whether the user equipment is using Rake reception or advanced receiver reception the procedure changes accordingly. Let us assume a situation where the user equipment is using Rake reception when the soft handover situation is entered, and only a TFCS for Rake receiver reception has been sent earlier to the user equipment. Then, in the soft handover situation, the new base station enables the use of advanced reception, such as PIC reception. Thus, another TFCS for PIC receiver reception should be sent to the user equipment in order to enable the using of the TFCS for advanced receiver reception in the soft handover situation. On the other hand, if the user equipment is using PIC reception when entering the soft handover situation and it has already received a TFCS for PIC receiver reception, then no other TFCSs are needed in the soft handover situation. The embodiment of the method ends in 416.

In an embodiment of the invention, the semi-static part of the TFCSs may be the same. The controller sends only that transport format combination set, which is relevant to the base station reception, to the user equipment. Thus, only the selection of a spreading factor may be different to Rake and advanced receiver receptions. Different transport format combination sets are generated for the Rake and the advanced receiver receptions, for example, and the basic difference in the semi-static parts is that puncturing for the advanced receiver reception is allowed in conjunction with a fact that the spreading factor selection is different. The above things with a normal rate matching will lead to the desired results.

Next, a more detailed description of how to handle rate matching in an embodiment of the invention is described. The differentiating factor between the transport format combinations for Rake and PIC receivers is the effecting coding rate. An effective coding rate for a given service is usually defined by the used spreading factor, coding rate and rate matching (either puncturing or repetition). The coding rate is one of the semi-static attributes of the transport format. There are also attributes in the semi-static part, which affect the rate matching; one is a semi-static rate matching attribute and the other is a puncturing limit for uplink. In an embodiment, the puncturing limit attribute may be utilized. The selection method is described next.

Both PIC and Rake receivers utilize a puncturing limit of their own. This allows separate adjustment of the ECR for both receiver types. If a PIC receiver is used, then the puncturing limit is a puncturing limit for the PIC receiver. Otherwise, the puncturing limit for the Rake receiver may be used. The puncturing limit for a Rake receiver may be 1 when the spreading factor is bigger than 4, and 0.8 when the spreading factor is 4, for example. In an embodiment, the puncturing limit for a PIC receiver may be defined with equation 3:

$$PL\_PIC = \frac{CR}{ECR_{max}\_PIC} \quad \text{Equation 3}$$

where:

PL_PIC is the puncturing limit for a PIC receiver,

CR is a coding rate, in which an overhead from a CRC and tail bits are taken into account, and $ECR_{max}\_PIC$ is the maximum value for the effective coding rate, ECR, for a PIC receiver.

The maximum value for the effective coding rate is a design parameter for all transport formats, that is, for all data rates, which value is not allowed to be exceeded. Thus, for each transport format there is a target ECR, which should be smaller than the maximum ECR.

When an advanced receiver, such as a PIC receiver, is used, the maximum possible allowable spreading factor with each ECR should be selected. As the different transport channels are multiplexed to the same physical channel, which is defined by the spreading factor, each ECR has to be taken into account when calculating the number of bits. The number of bits should fit to the size of a used physical channel. When a Rake receiver is used, the maximum possible spreading factor maximizes the ECR, but also smaller spreading factors can be used. Thus, a different criterion for selecting the spreading factor is used for Rake receivers than for advanced receivers. The user equipment has information at which point of the selection of the spreading factor the criterion for the advanced receivers should used. The information needed for making the proper selection of the spreading factor may be signalled to the user equipment, for example.

Above, it was also explained that a different criterion may be set for the maximum puncturing for Rake and advanced receivers. For turbo coding, for example, it may be defined that the coding rate has only one value (1/3) since that is the only possible value for turbo coding. Thus, the puncturing limit for a PIC receiver, for example, may be a function of only one parameter, that is, the ECRmax_PIC.

In an embodiment, the following radio resource control (RRC) parameters may be defined. If a first parameter, enabling of a higher effective coding rate (enable_higher_ECR=yes/no), is accepted, then the second parameter is used. If the first parameter, enable_higher_ECR, is rejected, then the rate matching of the standards produced by the Third Generation Partnership Project (3GPP) 3GPP release 99 may be used. The second parameter, puncturing limit with enabled higher ECR (PL_with_enable_higher_ECR=0.6), defines the maximum puncturing limit. Spreading factor selection may be defined by using the second parameter. In another embodiment, only the radio resource control (RRC) parameter enable_higher_ECR=yes/no is defined. Thus, a fixed value for the parameter PL_with_enable_higher_ECR is defined, for example the value of 0.6. In both of the previous examples, the TFCS is the same all the time and only one TFCS has to be signalled to the user equipment.

Even though the invention is described above with reference to an example according to the accompanying drawings, it is clear that the invention is not restricted thereto but it can be modified in several ways within the scope of the appended claims.

The invention claimed is:

1. A method of selecting transport channel parameters in a radio system, the method comprising:
    receiving information on a type of reception used in a base station of a radio system;
    generating a plurality of transport format combination sets (TFCSs), wherein each TFCS of the TFCSs comprises transport channel parameters, wherein the TFCSs comprise different effective coding rates for different data rates used in the radio system; and
    selecting a specific TFCS of the generated TFCSs to be used by a user equipment of the radio system for communication with the base station based upon the type of reception used in the base station and based upon the different effective coding rates of the TFCSs.

2. The method of claim 1, the method further comprising:
    sending one or more of the generated TFCSs to the user equipment.

3. The method of claim 2, the method further comprising:
    sending only the selected specific TFCS to the user equipment.

4. The method of claim 2, the method further comprising:
    sending more than one TFCS to the user equipment; and
    signaling to the user equipment which one of the TFCSs is the specific TFCS to be used by the user equipment.

5. The method of claim 1, wherein selecting the specific TFCS is based in part on a spreading factor, a coding rate, and a rate matching in the radio system.

6. The method of claim 1, the method further comprising:
    using a biggest possible spreading factor allowable with each of the effective coding rates.

7. The method of claim 1, further comprising:
    selecting the type of reception such that the type of reception used in the base station comprises at least one of RAKE reception and advanced reception.

8. The method of claim 7, further comprising:
    sending an indication of at least one of RAKE reception and advanced reception to the user equipment;
    determining if the user equipment is in soft handoff; and
    if the user equipment is not in soft handoff, selecting the specific TFCS based upon the type of reception used in the base station.

9. The method of claim 7, wherein the advanced reception comprises parallel interference cancellation.

10. A controller in a radio system, the controller controlling communication between user equipment and one or more base stations, the controller comprising:
    a receiver configured to receive information on a type of reception used in a base station; and
    a processor configured to generate a plurality of transport format combination set (TFCSs) comprising transport channel parameters, the TFCSs having different effective coding rates for different data rates used in the radio system; and to select a specific TFCS to be used by a user equipment based on the type of reception used in the base station and the effective coding rates of the TFCSs.

11. The controller of claim 10, wherein the processor further causes the controller to send the generated TFCSs to the user equipment.

12. The controller of claim 10, wherein the processor further causes the controller to send only the selected specific TFCS to the user equipment.

13. The controller of claim 11, wherein the processor further causes the controller to send an indication of the selected specific TFCS to the user equipment.

14. The controller of claim 10, wherein at least part of the controller is located in the base station of the radio system.

15. The controller of claim 10, wherein the specific TFCS selected is based in part on a spreading factor, a coding rate, and a rate matching in the radio system.

16. The controller of claim 10, wherein a biggest possible spreading factor allowable is used with each effective coding rate.

17. The controller of claim 10, wherein the type of reception comprises at least one of RAKE reception and advanced reception.

18. The controller of claim 17, wherein the processor further causes the controller to send an indication of at least one of RAKE reception and advanced reception to the user equipment;
to determine if the user equipment is in soft handoff; and
if the user equipment is not in soft handoff, to select the specific TFCS based upon the type of reception used in the base station.

19. The controller of claim 10, wherein each TFCS comprises a different effective coding rate for different transmit powers used in the radio system.

20. A controller in a radio system, the controller controlling communication between user equipment and one or more base stations, the controller comprising:
means for receiving information on a type of reception used in a base station;
means for generating a plurality of transport format combination sets (TFCSs), wherein each TFCS of the TFCSs comprises transport channel parameters, wherein the TFCSs comprise different effective coding rates for different data rates used in the radio system; and
means for selecting a specific TFCS of the generated TFCSs to be used by a user equipment based on the type of reception used in the base station and based on the different effective coding rates of the generated TFCSs.

21. The controller of claim 20, wherein at least part of the controller is located in the base station of the radio system.

22. The controller of claim 20, the controller further comprising:
means for sending the generated TFCSs to the user equipment.

23. The controller of claim 20, the controller further comprising:
means for sending only the selected specific TFCS to the user equipment.

24. The controller of claim 20, the controller further comprising:
means for sending more than one TFCS to the user equipment; and
means for signalling to the user equipment which one of the more than one TFCSs is the specific TFCS to be used by the user equipment.

25. User equipment for a radio system, the user equipment comprising:
means for receiving information on a type of reception used in a base station of a radio system;
means for receiving, from a controller, one or more transport format combination sets (TFCSs), wherein the TFCSs comprise different effective coding rates for different data rates used in the radio system; and
means for selecting which specific TFCS to use when communicating with the base station based on one of the type of reception used in the base station, the effective coding rates of the one or more TFCSs, and a current handover status.

26. The user equipment of claim 25, wherein the specific TFCS is further selected based on a spreading factor, a coding rate and a rate matching in the radio system.

27. The user equipment of claim 25, the user equipment further comprising:
using a biggest possible spreading factor allowable with each effective coding rate.

28. A radio system, comprising:
a base station that includes a receiver configured to provide information on a type of reception used in the base station;
a user equipment configured to communicate with the base station; and
a controller configured to control communication between the user equipment and the base station, wherein the controller includes a first processor configured to generate a plurality of transport format combination sets (TFCSs) including transport channel parameters, the TFCSs having different effective coding rates (ECRs) for different data rates used in the radio system, and to select a specific TFCS to be used by the user equipment based on the type of reception used in the base station and based on the ECR of the TFCSs, and wherein the user equipment includes a second processor configured to use the selected specific TFCS when communicating with the base station.

29. The method of claim 1, wherein each TFCS comprises a different effective coding rate for different transmit powers used in the radio system.

30. User equipment for a radio system, the user equipment comprising:
a receiver configured to receive information on a type of reception used in a base station of the radio system and to receive one or more transport format combination sets (TFCSs) comprising transport channel parameters from a controller of the radio system, the TFCSs having different effective coding rates for different data rates used in the radio system; and
a processor configured to select which specific TFCS to use when communicating with the base station based on the type of reception used in the base station and the effective coding rates of the one or more TFCSs.

* * * * *

UNITED STATES PATENT AND TRADEMARK OFFICE
CERTIFICATE OF CORRECTION

| | | |
|---|---|---|
| PATENT NO. | : 7,535,885 B2 | Page 1 of 1 |
| APPLICATION NO. | : 10/836620 | |
| DATED | : May 19, 2009 | |
| INVENTOR(S) | : Horneman et al. | |

It is certified that error appears in the above-identified patent and that said Letters Patent is hereby corrected as shown below:

On the Title page,

[*] Notice:   Subject to any disclaimer, the term of this patent is extended or adjusted under 35 USC 154(b) by 1077 days Delete the phrase "by 1077 days" and insert -- by 1403 days --

Signed and Sealed this

First Day of June, 2010

David J. Kappos
*Director of the United States Patent and Trademark Office*